United States Patent [19]

Murata et al.

[11] 4,319,836

[45] Mar. 16, 1982

[54] OPTICAL DEVICE OF A COPYING APPARATUS

[75] Inventors: Shinji Murata, Tokyo; Akiyoshi Torigai, Machida; Teruo Morikawa, Sagamihara; Masaki Nakaoka; Yoshiaki Sone, both of Tokyo, all of Japan

[73] Assignee: Canon Kabushiki Kaisha, Tokyo, Japan

[21] Appl. No.: 102,276

[22] Filed: Dec. 10, 1979

[30] Foreign Application Priority Data

Dec. 19, 1978 [JP] Japan .................. 53/174530[U]
Dec. 19, 1978 [JP] Japan .................. 53/174531[U]
Dec. 19, 1978 [JP] Japan .................. 53/174532[U]

[51] Int. Cl.³ ............................................. G03B 27/52
[52] U.S. Cl. ........................................ 355/55; 350/82; 350/252; 350/417; 354/286
[58] Field of Search ............... 355/51, 55, 57, 60, 355/65, 66; 350/82, 175 R, 178, 202, 245, 252, 257, 321; 354/202, 286; 356/124

[56] References Cited

U.S. PATENT DOCUMENTS 3,286,591 11/1966 Nitkiewicz .................. 355/55 X
3,604,795 9/1971 Crandall ..................... 355/57 X
4,020,496 4/1977 Peterson et al. ............. 354/202 X Primary Examiner—Richard A. Wintercorn
Attorney, Agent, or Firm—Fitzpatrick, Cella, Harper & Scinto

[57] ABSTRACT

A device for supporting and fixing at a predetermined position an optical member such as a lens barrel supporting therewithin a lens or a mirror which takes part in projecting the image of an original to be copied upon a photosensitive medium. The device has a plate member formed with a supporting surface for supporting the optical member by press cutting and an element for pressing the optical member against said supporting surface of the plate member.

14 Claims, 13 Drawing Figures

OPTICAL DEVICE OF A COPYING APPARATUS

BACKGROUND OF THE INVENTION

1. Field of the Invention

This invention relates to the optical device of a copying apparatus, and more particularly to a supporting device for lens or mirror.

2. Description of the Prior Art

FIG. 1 of the accompanying drawings schematically shows an example of the electrophotographic copying apparatus. The image of an original to be copied placed on an original carriage 1 moved in the direction of arrow is projected upon a photosensitive drum 5, rotated in the direction of arrow in synchronism with the original carriage 1, by a projection optical system comprising a plane mirror 2, a lens 3 and a plane mirror 4. The electrostatic image formed on the photosensitive drum 5 by the image projection is developed with toner. The developed image is transferred to paper. The toner image transferred to the paper is treated for fixation while, on the other hand, the drum 5 after the image transfer is cleaned.

In the copying apparatus as described above, the support the lens at a predetermined position in the original image projection light path, there has been a method using a casting bed having a V-shaped groove or an arcuately concave groove. However, this method encounters difficulties in providing the accuracy of the groove and is costly. It is also apt to create irregularity of the accuracy among individual devices. Also, in the case as shown in FIG. 2 of the accompanying drawings wherein a metal sheet is formed into a V-shaped or an arcuately shaped groove and a cylindrical lens barrel is received in such groove, the cost involved is low but the sheet thickness differs from one sheet to another and therefore, in each individual device, there occurs a bend dimensional error corresponding to the sheet thickness error $\Delta t$ and the error $\Delta x$ (distance between O and O') of the lens axis from its regular position with the hatched portion as the standard becomes $\Delta x = \Delta t/(\cos \theta/2)$, thus creating irregularity.

Such poor accuracy of the lens position lead to unclearness of resultant copies and this in turn leads to the inconvenience that complicated and cumbersome fine adjustment must be effected in each individual device.

Also, the usually practised method of mounting a plane mirror in the copying apparatus as shown in FIG. 1 is to adhesively secure or hold the back side of the reflecting surface of the mirror to or against the bent surface portion of two plate members, but this method encounters difficulties in keeping the accuracy of the angle of the bend thereof or of the relative angle between the two plates and requires fine adjustment in each individual device during the mass projection of devices and thus, it is inefficient. That is, a bend mold is usually made so as to correspond to the maximum value of the allowable error of the plate thickness, irregularity occurs to the right angle of the bend due to the irregularity of the plate thickness. In FIG. 3 of the accompanying drawings, if the plate thickness irregularity is $\Delta t$ and the length of the bent portion is L, then the bend error $\Delta \theta$ becomes $\sin \Delta \theta = \Delta t/L$ and this optically much far exceeds the tolerance, so that the planarity of the mirror M cannot be maintained. Also, if the angle between the bends of the two plates differs, the mirror will become distorted and again, sufficient planarity of the mirror cannot be maintained. In such case, resultant copy images will become unclear.

To offset such disadvantage, a method of using a casting as the mounting bed and milling the mirror mounting surface or a method using a diecast mounting bed has been attempted, but sufficient accuracy of inclination and planarity could not be obtained and it has finally been necessary to effect complicated and cumbersome fine adjustment in each individual device.

SUMMARY OF THE INVENTION

It is a primary object of the present invention to provide the optical device of a copying apparatus which can provide good images.

It is another object of the present invention to provide the optical device of a copying apparatus in which an optical member is held with high accuracy.

It is still another object of the present invention to provide the optical device of a copying apparatus in which an optical member is held with high accuracy by a simple construction.

It is yet still another object of the present invention to provide the optical device of a copying apparatus in which an optical member is held with reduced irregularity of accuracy among individual devices.

It is a further object of the present invention to provide the optical device of a copying apparatus which can reduce the cost of manufacture.

The dimensional accuracy of cutting surfaces formed in plate members by press cutting can be maintained constant for each plate member during mass production and has little or no relation to the thickness of the plate members, and the present invention supports the optical member in the device with high accuracy by making the most of the advantage of such press cutting technique.

Other objects and features of the present invention will become fully apparent from the following detailed description taken in conjunction with the accompanying drawings.

DESCRIPTION OF THE PREFERRED EMBODIMENTS

Figure 1:
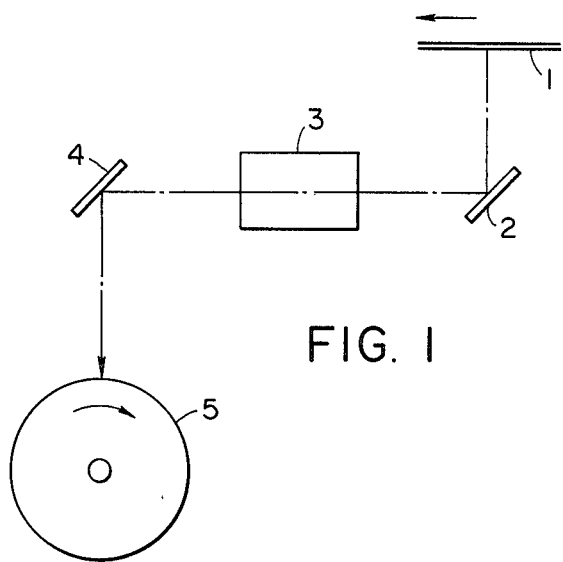
FIG. 1 schematically shows an example of the copying apparatus.
Figure 2:
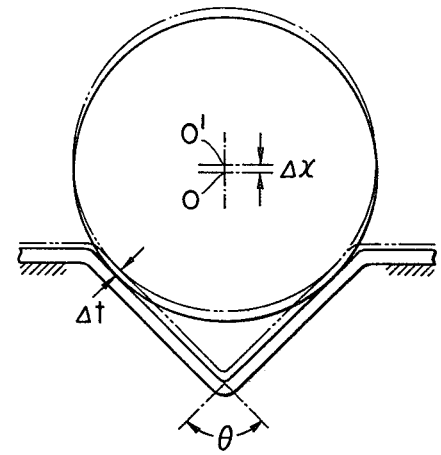
FIG. 2 shows the lens supporting device in the conventional copying apparatus.
Figure 3:
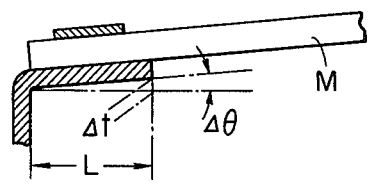
FIG. 3 shows the mirror supporting device in the conventional copying apparatus.
Figure 4:
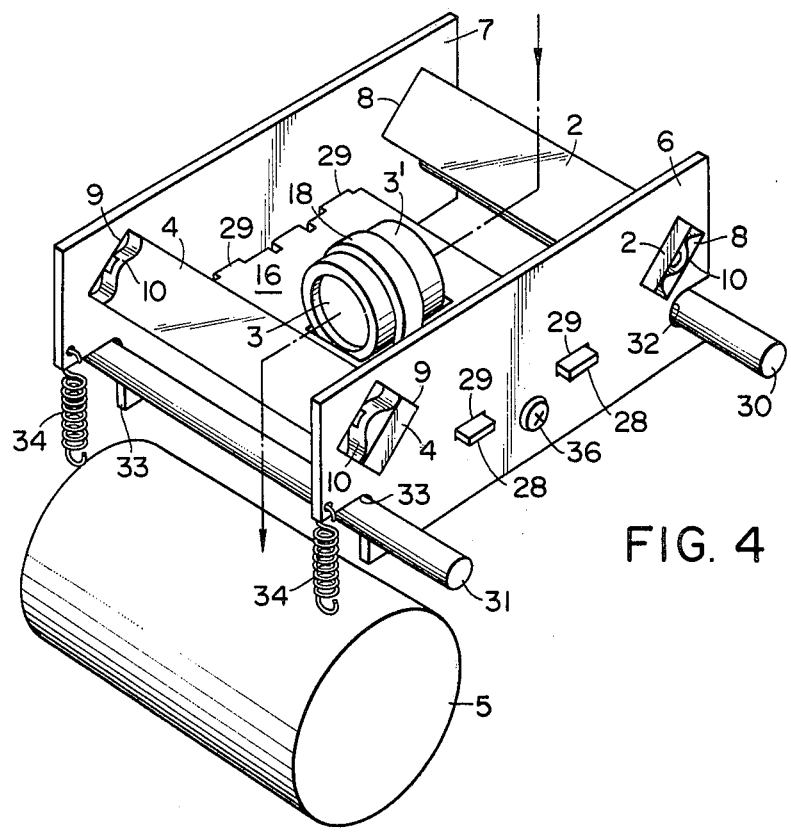
FIG. 4 shows an embodiment of the present invention.

Mirrors 2 and 4 and lens 3 of FIG. 1 are held in the manner as shown in FIG. 4. In FIG. 4, two side plates 6 and 7 made of metal sheets are formed with holes 8, 9, 29 and recesses 32, 33 by the same press metallic mold. Not only the same press metallic mold is used for the making of the side plates 6 and 7 but also the molded portions forming the holes 8, 9, 29 and the recesses 32, 33 are formed by the same metallic mold. Accordingly, the mutual positional relationship between the holes and the recesses in the plate 6 is accurately in accord with that in the plate 7.

The reflecting surfaces of the mirrors 2 and 4 bear against one cutting surface of the holes 8 and 9. Plate springs 10 are forced into between the back sides of the mirrors and the other cutting surfaces opposed to said cutting surfaces of the holes 8 and 9. These plate springs 10 resiliently press and support the mirrors 2 and 4 against said one cutting surface.

Figure 5:
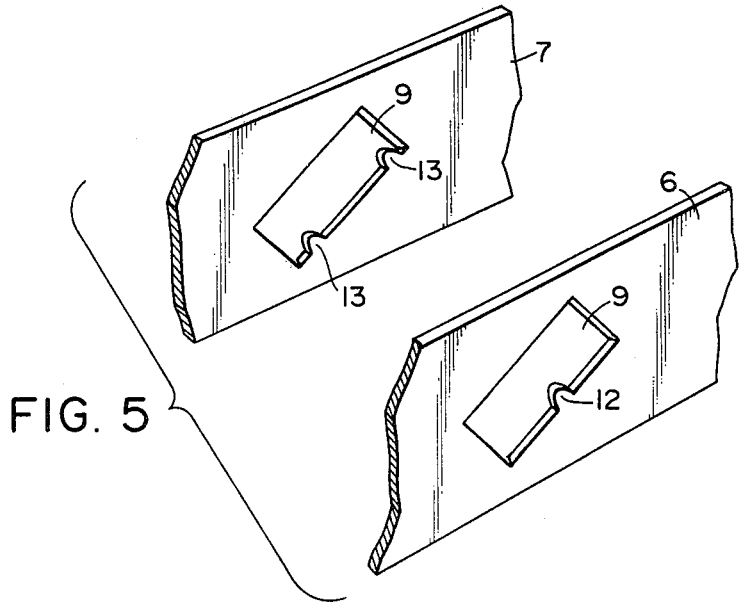
FIG. 5 shows another example of the mirror supporting portion.
Figure 6:
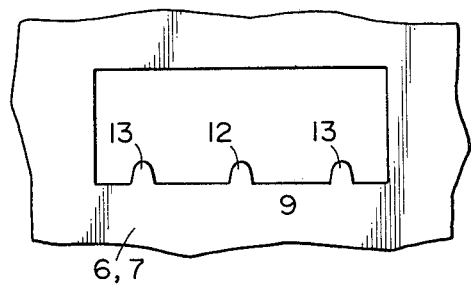
FIG. 6 illustrates the method of making the mirror supporting portion of FIG. 5.
Figure 7:
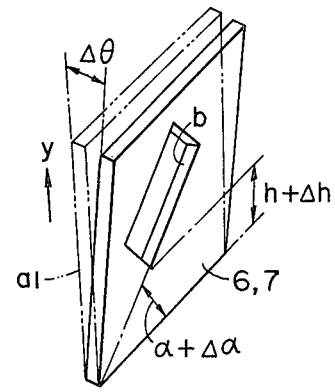
FIG. 7 shows an effect of the present invention.

The press cutting surfaces against which said mirrors are pressed may be straight surfaces but may alternatively be formed as shown in FIG. 5. FIG. 5 exemplarily shows the hole 9 in which the mirror 4 is disposed. A projection 12 is formed in the mirror 4 supporting press cutting surface of the plate 6 and two projections 13 are formed in the mirror 4 supporting press cutting surface of the plate 7, so that the reflecting surface of the mirror 4 bears against these three projections and is resiliently held by the aforementioned plate springs 10. These projections 12 and 13 may be formed in the following manner. That is, a hole 9 having three projections 12 and 13 is formed in each of the plates 6 and 7, as shown in FIG. 6, and then the two projections 13 are excised from the plate 6 and one projection 12 is excised from the plate 7. This also holds true with the hole 8 for supporting the mirror 2. Anyway, the mirrors 2 and 4 are three-point-supported by the three projections as described above and moreover, these projected portions are rendered into cutting surfaces formed by the same press mold, whereby the planarity of the mirrors 2 and 4 can be provided with very high accuracy.

It is also possible to simply prevent the planarity of the mirrors and the mounting angle of the mirrors to the side plates from becoming irregular among individual devices. Also, even if the plates 6 and 7 are inclined by $\Delta\theta$ from an ideal plane a1, the error $\Delta h$ of the cutting surface b in the y-direction becomes $\Delta h = h(1 - \cos\theta)$ and the error $\Delta\alpha$ of the angle $\alpha$ becomes $\Delta\alpha = \alpha \tan^{-1}(-\tan\alpha \cos\theta) - \alpha$, and these are so minute that they can be neglected. The plate thickness t has nothing to do with this. Accordingly, for individual devices, accuracy can be maintained constant.

Figure 8:
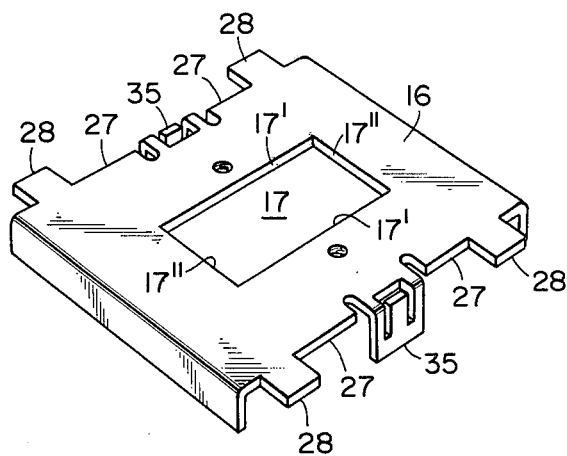
FIG. 8 shows a connecting plate.

The above-described side plates 6 and 7 are held parallel to each other by a connecting plate 16 shown in FIG. 8. The connecting plate 16 is formed with four helves 28 located at positions corresponding to the two helve holes 29 in each of the plates 6 and 7. These four helves 28 may be simultaneously formed on the plate 16 by the same press metallic mold. By this press cutting, four cutting surfaces 27 are simultaneously formed at positions adjacent to the helves 28. The helves 28 are fitted into the holes 29 of the side plates 6 and 7 to thereby determine the mutual positional relation with respect to the surface directions of the side plates 6 and 7. The surfaces of the plates 6 and 7 bear against said cutting surfaces 27 to thereby hold the plates 6 and 7 parallel to each other.

Thus, the orthographic projection of the plate 6 with respect to the plate 7 is in accord with the shape of the plate 7. The plate 16 is provided with bent portions 35 for fixing the side plates 6 and 7 to the plate 16, and the side plates 6 and 7 may be fastened to the bent portions 35 by screws 36.

The connecting plate 16 is formed with a rectangular hole 17 cut by a press metallic mold, as shown in FIG. 8. The press metallic mold portion for cutting this hole 17 is formed into the same metallic mold as that for forming the projections 28.

Of the cutting surfaces of the hole 17, the spacing between the longer sides 17' is smaller than the outside diameter of a cylindrical barrel 3' which supports the lens 3 therewithin, while the spacing between the shorter sides 17" is greater than the full length of the barrel 3'. When the connecting plate 16 is mounted in the device, the longer side cutting surfaces 17' are parallel to the optic axis of the lens and accordingly, the surface of the connecting plate 16 is also parallel to the optic axis of the lens.

Figure 9:
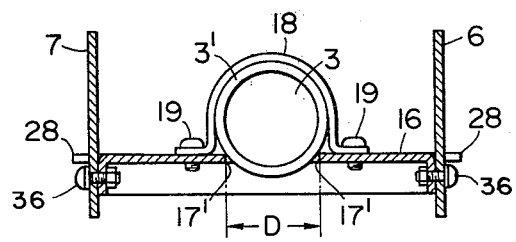
FIGS. 9 and 10 illustrate how the lens is supported.
Figure 10:
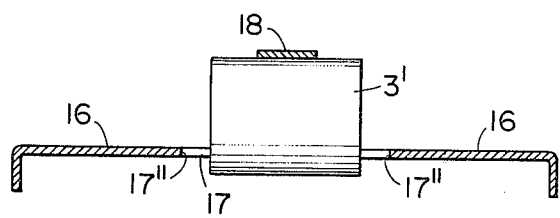
Figure 11:
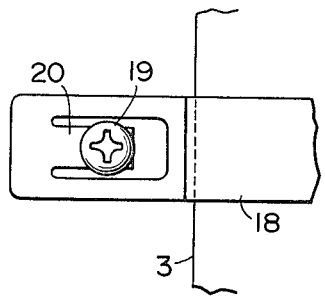
FIG. 11 shows lens fixing means.

The lens is positioned and fixed in the following manner. That is, the lens barrel 3' is dropped into the press hole 17 of the connecting plate 16. Since the spacing between the cutting surfaces 17' is smaller than the outside diameter of the lens barrel as already described, the lens barrel 3' bears against the upper edges of the two cutting surfaces 17' at two locations of its outer peripheral surface as shown in FIGS. 9 and 10, whereby the lens barrel is supported. The lens barrel 3' so supported by the two cutting surfaces 17' of the press hole 17 is integrally fixed to the plate 16 by a band 18. The band 18 has a spring portion 20 in its base as shown in FIG. 11, and by fastening this spring portion 20 to the connecting plate 16 by a screw 19, the lens barrel 3' is resiliently pressed against the upper edges of the cutting surfaces 17'.

After having been dropped into the press hole 17, the lens is finely adjusted in the direction of its optic axis in order that the original image on a photosensitive medium may be focused. For this purpose, the screw 19 may be loosened to permit the lens barrel 3' to be slidden along the longer sides 17' of the hole 17. This positioning and adjustment may be more accurately accomplished by carrying out the procedure as shown in FIGS. 12 and 13.

Figure 12:
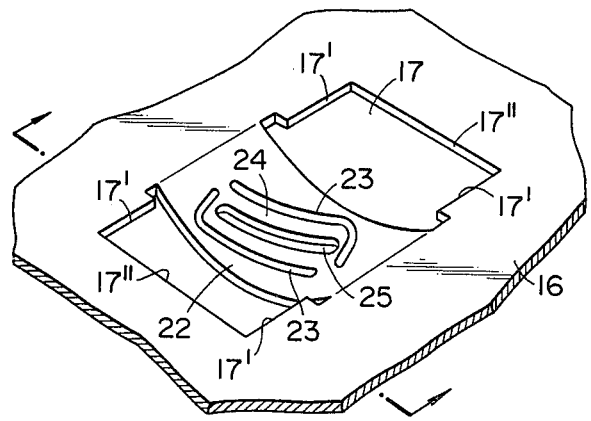
FIGS. 12 and 13 illustrate focus adjusting means.
Figure 13:
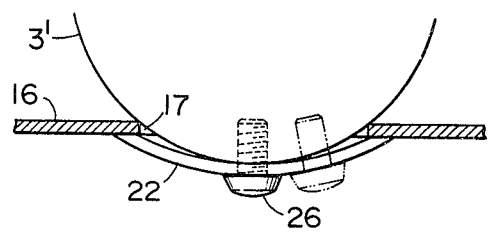

In FIGS. 12 and 13, reference numeral 22 designates a recess formed in the center of the hole 17 by the same press metallic mold as that used to form the hole 17, so that when the lens barrel 3' is dropped into the hole 17 and supported by the longer side cutting surfaces thereof as already noted, the outer peripheral surface of the lens barrel 3' lightly contacts the upper surface of the recess 22 or is slightly spaced apart therefrom. In the center of this recess, there is a resilient portion 24 formed by cuts 23, and a slot 25 inclined with respect to the optic axis of the lens is formed in the resilient portion 24. A screw 26 is threaded into the lens barrel 3' through the inclined slot 25. If the screws 19 and 26 are loosened and the lens barrel 3' is rotated about the optic axis, the lens barrel 3' is moved back and forth in the direction of the optic axis under the guide of the screw 26 through the slot 25. Instead of providing the above-described recess 22 in the hole 17, a slot such as the above-described slot 25 may be provided in the band 18 and a screw may be threaded into the lens barrel through that slot, whereby positioning and adjustment of the lens 3 in the direction of its optic axis may likewise be accomplished.

The mirrors 2, 4 and lens 3 fixed to one another in the described manner are held in the light path by bringing the recessed surface 32 formed in the side plates 6 and 7 by press cutting into engagement with a shaft 30 secured to the body of the copying apparatus and supporting the side plate 6, 7 and the connecting plate 16 for rotation about the shaft 30 while, at the same time, placing the recessed surfaces 33 formed in the side plates 6, 7 by press cutting onto a shaft 31 secured to the body of the copying apparatus and urging the recessed surfaces 33 against the shaft 31 by means of springs 34.

What we claim is:

1. An optical device for projecting an image of an original to be copied onto a photosensitive member of a copying machine, comprising:
   an optical assembly including,
   means for reflecting light from the original,
   first and second plate members each having a reference surface for positioning said plate member and a supporting surface for supporting said reflecting means, said reference surface and supporting surfaces being formed by one and the same punch,
   a third plate member for connecting said first and second plate members in a face-to-face relation,
   means for mounting said first and second plate members to said third plate member, and
   means for urging said reflecting means against the supporting surfaces;
   positioning means, adapted to be fixed to the copying machine, for positioning and supporting said optical assembly in place in the copying machine, said reference surfaces of said first and second plate members being aligned with each other for engagement with said positioning means; and
   fixing means for fixing said optical assembly to said positioning means.

2. An optical device according to claim 1, wherein said optical assembly includes a lens barrel having a lens therein and means for mounting the lens barrel on said third plate member.

3. An optical device according to claim 2, wherein said third plate member includes an opening having two linearly opposed edges which are spaced apart at a distance which is less than a diameter of said lens barrel, and wherein said lens mounting means includes a fixing member for fixing the lens barrel in the opening.

4. An optical device according to claim 3, wherein said lens mounting means is provided with an elongated opening extending obliquely to the optical axis of the lens, and said lens barrel has a projection engaged into the elongated opening, wherein rotation of the lens barrel causes movement thereof along the optical axis of the lens to allow adjustment of the position of the lens barrel.

5. An optical device according to claim 1, wherein said supporting surface of said first plate member comprises an end face of a first projection, and the supporting surface of the second plate member comprises end faces of a pair of projections, said respective projections being formed by punching said first and second plate members to form in both members three projections, and then cutting out two of the projections from the first plate member and one of the projections from the second plate member, wherein the remaining projections comprise the supporting projections.

6. An optical device according to claim 1, 2 or 5 wherein the third plate member has at least two projecting elements formed by punching, said first and second members are each provided with at least one opening, punched by the same punch, for receiving the projecting elements.

7. An optical device according to claim 3 or 4, wherein the third plate member has at least two projecting elements punched by the same punch as used for forming the lens supporting opening, and wherein the first and second plate members are each provided with at least one opening, punched by the same punch as used for forming said supporting surfaces and said reference surfaces, for receiving the projecting elements of the third plate member.

8. An optical device for projecting an image of an original to be copied onto a photosensitive member of a copying machine, comprising:
   an optical assembly including,
   means for reflecting light from the original,
   first and second plate members each having first and second reference surfaces for positioning said plate member and a supporting surface for supporting said reflecting means, said reference surface and supporting surfaces being formed by one and the same punch,
   a third plate member for connecting said first and second plate members in a face-to-face relation,
   means for mounting said first and second plate members to said third plate member, and
   means for urging said reflecting means against the supporting surfaces;
   first and second positioning means, adapted to be fixed to the copying machine, for positioning and supporting said optical assembly in place in the copying machine, said first reference surfaces of said first and second plate members being faced to each other and engaged with said first positioning means, and said second reference surfaces of said first and second plate members being faced to each other and engaged with said second positioning means; and
   resilient means for resiliently urging said first reference surfaces of said first and second plate members against said first positioning means to define a force moment about said second positioning means.

9. An optical device for projecting an image of an original to be copied onto a photosensitive member of a copying machine, comprising:
   an optical assembly including,
   means for reflecting light from the original,
   first and second plate members each having a reference surface for positioning said plate member and a supporting surface for supporting said reflecting means, said reference surface and supporting surfaces being formed by one and the same punch,
   a third plate member for connecting said first and second plate members in a face-to-face relation,
   means for mounting said first and second plate members to said third plate member, and
   means for urging said reflecting means against the supporting surfaces, wherein one of said plate members has a punched surface to which a surface of another said member is abutted, and one of said plate members engaged has a projection formed by a punch, and another said member has a punched opening into which the projection is inserted;
   positioning means, adapted to be fixed to the copying machine, for positioning and supporting said optical assembly in place in the copying machine, said reference surfaces of said first and second plate members being aligned with each other for engagement with said positioning means; and
   fixing means for fixing said optical assembly to said positioning means.

10. An optical device according to claim 8 or 9, wherein said optical assembly includes a lens barrel having a lens therein and means for mounting the lens barrel on the third plate member.

11. An optical device according to claim 10, wherein said third plate member includes an opening having two linearly opposed edges which are spaced apart at a distance which is less than a diameter of said lens barrel, and wherein said lens mounting means includes a fixing member for fixing the lens barrel in the opening, and means for adjusting a position of the lens in the direction of said linear edges.

12. An optical device according to claim 8 or 9, wherein said supporting surface of said first plate member comprises an end face of a first projection, and the supporting surface of the second plate member comprises end faces of a pair of projections, said respective projections being formed by punching said first and second plate members to form in both members three projections, and then cutting out two of the projections from the first plate member and one of the projections from the second plate member, wherein the remaining projections are engaged to the reflecting surface of the reflecting means.

13. An optical device for projecting an image of an original to be copied onto a photosensitive member of a copying machine, comprising:

means for reflecting light from the original;

an imaging lens for receiving the light from said reflecting means and projecting the light on the photosensitive member;

a lens barrel having therein said imaging lens; and supporting means for supporting said lens barrel on the copying machine, said supporting means including a plate member provided with a punched opening having two linearly opposed edges which are spaced apart a distance which is less than a diameter of said lens barrel, and wherein said supporting means includes a fixing member for fixing the lens barrel in the opening so that the optical axis of the lens is in parallel with the plate member.

14. An optical device for projecting an image of an original to be copied onto a photosensitive member of a copying machine, comprising:

a projection optical system having a mirror and a lens;

supporting means for supporting the mirror at a predetermined position in the copying machine, said supporting means having first and second plate members provided with punched surfaces for supporting said mirror and punched reference surfaces adapted to be engaged to positioning means provided on the copying machine;

spring means for resiliently urging ends of said mirror to said mirror supporting surface; and fixing means for fixing said first and second plate members to the positioning means;

wherein the mirror supporting surface of said first plate member comprises an end surface of a first projection, and the mirror supporting surfaces of the second plate member comprise end surfaces of a pair of projections, the respective projections being formed by punching said first and second plate members to form in both members three projections, and then cutting out two projections from the first plate member and one projection from the second plate member, wherein the remaining projections comprise the supporting projections.

* * * * *